US006186406B1

(12) United States Patent
Ackley

(10) Patent No.: US 6,186,406 B1
(45) Date of Patent: *Feb. 13, 2001

(54) BAR CODE SYMBOLOGY CAPABLE OF ENCODING BYTES, WORDS, 16-BIT CHARACTERS, ETC. AND METHOD AND APPARATUS FOR PRINTING AND READING SAME

(75) Inventor: H. Sprague Ackley, Seattle, WA (US)

(73) Assignee: Intermec IP Corporation, Beverly Hills, CA (US)

(*) Notice: Under 35 U.S.C. 154(b), the term of this patent shall be extended for 0 days.

This patent is subject to a terminal disclaimer.

(21) Appl. No.: 09/265,631

(22) Filed: Mar. 9, 1999

Related U.S. Application Data

(63) Continuation of application No. 08/842,644, filed on Apr. 16, 1997, which is a continuation-in-part of application No. 08/701,304, filed on Aug. 21, 1996, now Pat. No. 5,811,781, which is a division of application No. 08/295,382, filed on Aug. 24, 1994, now Pat. No. 5,557,092, which is a continuation-in-part of application No. 08/147,376, filed on Nov. 5, 1993, now abandoned.

(51) Int. Cl.[7] ............................. G06K 7/10; G06K 19/06
(52) U.S. Cl. ................................. 235/494; 235/462.01
(58) Field of Search ............................. 235/494, 439, 235/435, 462.01, 462.02, 462.03, 462.04, 462.05, 462.07, 462.08, 454, 472.01

(56) References Cited

U.S. PATENT DOCUMENTS

| 4,079,482 | 3/1978 | Yeh ............ 197/1 A |
| 4,308,455 | 12/1981 | Lazzarotti et al. 235/462 |
| 5,097,263 | 3/1992 | Delpech et al. .. 341/155 |
| 5,128,526 | 7/1992 | Yoshida ........ 235/456 |
| 5,184,005 | 2/1993 | Ukai et al. ...... 235/472 |
| 5,298,165 | 4/1993 | Yoshida ........ 235/456 |
| 5,384,451 | 3/1994 | Ett ............ 235/494 |
| 5,473,151 | 2/1995 | Mihm et al. .... 235/375 |
| 5,416,308 | 5/1995 | Allum et al. .... 235/375 |
| 5,539,195 | * 12/1995 | Longacre, Jr. ... 380/54 |
| 5,541,081 | 7/1996 | Ackley ........ 235/462 |
| 5,545,620 | * 8/1996 | Storch et al. .... 235/472 |
| 5,557,091 | 9/1996 | Bossen et al. ... 235/462 |
| 5,561,222 | * 9/1996 | Ackley et al. ... 235/462 |
| 5,612,191 | 3/1997 | Barkan ........ 235/462 |
| 5,715,277 | 4/1997 | Ackley ........ 235/462 |
| 5,742,578 | 7/1998 | Heske, III et al. . 235/463 |
| 5,811,010 | 7/1998 | Liu et al. ...... 235/462 |
| 5,979,081 | * 9/1998 | Ackley ........ 235/462 |
| 700 | * 8/1999 | Ackley ...... 235/462.01 |

FOREIGN PATENT DOCUMENTS

| 3330261 A1 | 3/1985 | (DE) ............................. G06K/1/12 |
| 0667592 A1 | 8/1995 | (EP) ............................. G06K/19/06 |
| WO95/12863 | 5/1995 | (WO) ............................. G06K/19/06 |
| WO96/13803 | 5/1996 | (WO) ............................. G06K/19/06 |
| WO98/47101 | 10/1998 | (WO) ............................. G06K/19/06 |

OTHER PUBLICATIONS

AIM USA, "Uniform Symbology Specification Code 49", American National Standards Institute, Inc., Approved Aug. 16, 1995, pp. 1–26.

(List continued on next page.)

Primary Examiner—Thien M. Le
(74) Attorney, Agent, or Firm—Perkins Coie LLP

(57) ABSTRACT

A new bar code symbology in an exemplary embodiment employs three bars (and spaces) within nine modules, similar to Code 93. Fifty-three data characters are defined, including several special mode characters. By employing these special mode characters, together with certain routines, three symbol characters can represent two 8-bit bytes, or one 16-bit word. As a result, the symbology can efficiently encode 8-bit bytes for use in computer processing, or encode 16-bit character sets such as Unicode. Symbology encodes extended channel interpretation (ECI) numbers, provides multiple numeric compression modes, provides a structured append using a single mode character, as well as other features.

29 Claims, 6 Drawing Sheets

OTHER PUBLICATIONS

AIM USA, "Uniform Symbology Specification Code 16K", American National Standards Institute, Inc., Approved Aug. 16, 1995, pp. 1–17.

AIM USA, "Uniform Symbology Specification PDF417", Jul. 1994, pp. 1–34.

AIM USA, "Uniform Symbology Specification Code One", Jul. 1994, pp. 1–32.

AIM USA, "Uniform Symbology Specification Code 128", American National Standards Institute, Inc., Approved Aug. 16, 1995, pp. 1–12.

AIM International Inc., "International Technical Specification—Symbology Identifiers", Jun. 18, 1998, Document Version 1.0, pp. 1–17.

AIM International, Inc., International Symbology Specification—Data Matrix:, May 8, 1997, pp. 1–95.

AIM International, Inc., "International Symbology Specification MaxiCode", May 8, 1997, pp. 1–44.

AIM USA, "Understanding 2D Symbologies, A Detailed Overview and Technical Introduction", Copyright 1999, pp. 1–50/.

*The Unicode Standard, Worldwide Character Encoding*, Version 1.0, vol. 1, Addison–Wesley Publishing Company, Inc., Reading, MA, pp. 1–6 and 340, Nov. 28, 1994.

Walker, Nathan, "ASCII–based compaction eases bar–code decoder's work," *Electronic Design* 30(22):163–166, Oct. 1982.

"Information processing—8–bit single–byte coded graphic character sets—Part 1: Latin alphabet No. 1," Internaional Organization for Standardization, 1987, pp. 1–7.

Information processing—8–bit single–byte coded graphic character sets—Part 4: Latin alphabet No. 4, International Organization for Standardization, 1988, pp. 1–5.

*Bar Code Print Quality—Guideline*, American National Standards Institute, New York, NY, 1990, pp. 1–29.

"Bar Code Compression Decompression," *IBM Technical Disclosure Bulletin* 32(12):288–290, May 1990.

Palmer, Roger C., *Symbologies*, Halmers Publishing, Inc., New Hampshire, 1991, Chap. 4, pp. 15–59.

"Alphanumeric Data Compaction," Intermec Corporation, Everett, WA, 1992, 6 pgs.

"Bar Coding—Symbology Specification—Codablock, Codablock F (128)," ICS International AG, 1993, pp. 1–44.

*Uniform Symbology Specification Code 93*, AIM USA, Apr. 1993, pp. 1–10.

"Extended Channel Interpretion," *ECI Assignments*, Release 2, Aug. 1995, pp. 1–12.

Schuessler, Rick, "Using Extended Channel Interpretations (ECI's) for International Character Set Standardization," in *Proc. of Scan–Tech*, Chicago, IL, Nov. 1996, pp. 294–305.

* cited by examiner

Character Assignments

| value | character | data | value | character | data |
|-------|-----------|------|-------|-----------|------|
| 00 | 131112 | 0 | 29 | 211221 | T |
| 01 | 111213 | 1 | 30 | 221121 | U |
| 02 | 111312 | 2 | 31 | 222111 | V |
| 03 | 111411 | 3 | 32 | 112122 | W |
| 04 | 121113 | 4 | 33 | 112221 | X |
| 05 | 121212 | 5 | 34 | 122121 | Y |
| 06 | 121311 | 6 | 35 | 123111 | Z |
| 07 | 111114 | 7 | 36 | 121131 | - |
| 08 | 131211 | 8 | 37 | 311112 | . |
| 09 | 141111 | 9 | 38 | 311211 | sp |
| 10 | 211113 | A | 39 | 321111 | $ |
| 11 | 211212 | B | 40 | 112131 | / |
| 12 | 211311 | C | 41 | 113121 | + |
| 13 | 221112 | D | 42 | 211131 | % |
| 14 | 221211 | E | 43 | 121221 | S1 |
| 15 | 231111 | F | 44 | 312111 | S2 |
| 16 | 112113 | G | 45 | 311121 | S3 |
| 17 | 112212 | H | 46 | 122211 | S4 |
| 18 | 112311 | I | 47 | 111132 | ECI |
| 19 | 122112 | J | 48 | 111231 | Numeric Mode (3.3-bit) |
| 20 | 132111 | K | 49 | 113112 | Byte Mode (8-bit) |
| 21 | 111123 | L | 50 | 113211 | Word Mode (16-bit) |
| 22 | 111222 | M | 51 | 213111 | FNC 1 |
| 23 | 111321 | N | 52 | 411111 | Unassigned |
| 24 | 121122 | O |    | 111141 | Start |
| 25 | 131121 | P |    | 1111411 | Stop |
| 26 | 212112 | Q |    |        |      |
| 27 | 212211 | R |    |        |      |
| 28 | 211122 | S |    |        |      |

*Fig. 2*

| ASCII VALUE | ASCII CHAR. | 93i | ASCII VALUE | ASCII CHAR. | 93i | ASCII VALUE | ASCII CHAR. | 93i | ASCII VALUE | ASCII CHAR. | 93i |
|---|---|---|---|---|---|---|---|---|---|---|---|
| 0 | NUL | [S2] U | 32 | SP | SPACE | 64 | @ | [S2] V | 96 | ` | [S2] W |
| 1 | SCH | [S1] A | 33 | ! | [S3] A | 65 | A | A | 97 | a | [S4] A |
| 2 | STX | [S1] B | 34 | " | [S3] B | 66 | B | B | 98 | b | [S4] B |
| 3 | ETX | [S1] C | 35 | # | [S3] C | 67 | C | C | 99 | c | [S4] C |
| 4 | EQT | [S1] D | 36 | $ | $ | 68 | D | D | 100 | d | [S4] D |
| 5 | ENQ | [S1] E | 37 | % | % | 69 | E | E | 101 | e | [S4] E |
| 6 | ACK | [S1] F | 38 | & | [S3] F | 70 | F | F | 102 | f | [S4] F |
| 7 | BEL | [S1] G | 39 | ' | [S3] G | 71 | G | G | 103 | g | [S4] G |
| 8 | BS | [S1] H | 40 | ( | [S3] H | 72 | H | H | 104 | h | [S4] H |
| 9 | HT | [S1] I | 41 | ) | [S3] I | 73 | I | I | 105 | i | [S4] I |
| 10 | LF | [S1] J | 42 | * | [S3] J | 74 | J | J | 106 | j | [S4] J |
| 11 | VT | [S1] K | 43 | + | + | 75 | K | K | 107 | k | [S4] K |
| 12 | FF | [S1] L | 44 | , | [S3] L | 76 | L | L | 108 | l | [S4] L |
| 13 | CR | [S1] M | 45 | - | - | 77 | M | M | 109 | m | [S4] M |
| 14 | SO | [S1] N | 46 | . | . | 78 | N | N | 110 | n | [S4] N |
| 15 | SI | [S1] O | 47 | / | / | 79 | O | O | 111 | o | [S4] O |
| 16 | DLE | [S1] P | 48 | 0 | 0 | 80 | P | P | 112 | p | [S4] P |
| 17 | DC1 | [S1] Q | 49 | 1 | 1 | 81 | Q | Q | 113 | q | [S4] Q |
| 18 | DC2 | [S1] R | 50 | 2 | 2 | 82 | R | R | 114 | r | [S4] R |
| 19 | DC3 | [S1] S | 51 | 3 | 3 | 83 | S | S | 115 | s | [S4] S |
| 20 | DC4 | [S1] T | 52 | 4 | 4 | 84 | T | T | 116 | t | [S4] T |
| 21 | NAK | [S1] U | 53 | 5 | 5 | 85 | U | U | 117 | u | [S4] U |
| 22 | SYN | [S1] V | 54 | 6 | 6 | 86 | V | V | 118 | v | [S4] V |
| 23 | ETB | [S1] W | 55 | 7 | 7 | 87 | W | W | 119 | w | [S4] W |
| 24 | CAN | [S1] X | 56 | 8 | 8 | 88 | X | X | 120 | x | [S4] X |
| 25 | EM | [S1] Y | 57 | 9 | 9 | 89 | Y | Y | 121 | y | [S4] Y |
| 26 | SUB | [S1] Z | 58 | : | [S3] Z | 90 | Z | Z | 122 | z | [S4] Z |
| 27 | ESC | [S2] A | 59 | ; | [S2] F | 91 | [ | [S2] K | 123 | { | [S2] P |
| 28 | FS | [S2] B | 60 | < | [S2] G | 92 | \ | [S2] L | 124 | | | [S2] Q |
| 29 | GS | [S2] C | 61 | = | [S2] H | 93 | ] | [S2] M | 125 | } | [S2] R |
| 30 | RS | [S2] D | 62 | > | [S2] I | 94 | ^ | [S2] N | 126 | ~ | [S2] S |
| 31 | US | [S2] E | 63 | ? | [S2] J | 95 | _ | [S2] O | 127 | DEL | [S2] T |

Note: Shift 1 denoted by [S1], Shift 2 denoted by [S2], Shift 3 denoted by [S3], Shift 4 denoted by [S4].

*Fig. 5*

BAR CODE SYMBOLOGY CAPABLE OF ENCODING BYTES, WORDS, 16-BIT CHARACTERS, ETC. AND METHOD AND APPARATUS FOR PRINTING AND READING SAME

CROSS-REFERENCE TO RELATED APPLICATIONS

This application is a Continuation of pending U.S. patent application Ser. No. 08/842,644, filed on Apr. 16, 1997, which is a CIP of application Ser. No. 08/701,304, filed Aug. 21, 1996 now U.S. Pat. No. 5,811,724, which is a Divisional of Ser. No. 08/295,382, filed Aug. 24, 1994, now U.S. Pat. No. 5,557,092, which is a CIP of Ser. No. 08/147,376, filed Nov. 5, 1993, now abandoned.

TECHNICAL FIELD

This invention relates to a new machine-readable symbology, and devices and methods for reading or printing bar code symbols under the symbology.

BACKGROUND OF THE INVENTION

Bar code symbologies were first disclosed in U.S. Pat. No. 1,985,035 by Kermode and expanded shortly thereafter in the 1930's in U.S. Pat. No. 2,020,925 by Young, assigned to Westinghouse. These early symbologies were printed by generating a multiplicity of single width elements of lower reflectance, or "bars," which were separated by elements of higher reflectance, or "spaces." An "element" is a bar or space. These early symbologies, and many "bar code symbologies" used today can be referred to as "linear symbologies" because data in a given symbol is decoded along one axis or direction. Symbologies such as linear symbologies encode "data characters" (e.g., human readable characters) as "symbol characters," which are generally parallel arrangements of alternating bars and spaces that form unique groups of patterns to encode specific data characters. "Data characters" include not only human readable characters, but also include special function characters such as start, stop or shift characters that provide certain functional data. Each unique group or pattern of bars and spaces within a predetermined width defines a particular symbol character, and thus a particular data character or characters.

The known U.P.C. symbology can be described generically as a (7,2) "n,k code." An "n,k code" is defined as a symbology where each symbol character has "k" number of bars and spaces and whose total length is "n" modules long. Therefore, the U.P.C. symbology encodes two bars and two spaces in each symbol character and each symbol character is seven modules long. A "module" is the narrowest nominal width unit of measure in a bar code symbology (a one-wide bar or space). "Nominal" refers to the intended value of a specific parameter, regardless of printing errors, etc. Under common counting techniques, the number of possible symbol characters can be found by realizing that in seven modules, there are six locations where a transition can occur, and that for two bars and two spaces, there are three internal transitions. Therefore, the number of unique symbol characters for the U.P.C. symbology is simply 6 choose 3 which equals 20. Similarly, under the Code 128 symbology, which is an (11,3) symbology, 252 unique symbol characters are available (10 choose 5).

The bar code symbologies known as U.P.C., EAN, Code 11 and Codabar are all bar code symbology standards which support only numeric data characters, and a few special characters such as "+" and "–". The U.P.C. symbology is both a bar code standard, as well as an industry standard, in that it has been adopted by industry in a standard application (consumer goods). The bar code standard Code 39 was the first alphanumeric bar code symbology standard developed. However, it was limited to 43 characters.

Code 93 is an improvement over Code 39. Code 93 is a continuous bar code symbology employing four element widths. Each Code 93 symbol has nine modules that may be either black or white (either a bar or a space). Each symbol in the Code 93 standard contains three bars and three spaces (six elements), whose total length is nine modules long. Code 93, having nine modules and three bars per symbol is thus a (9,3) symbology which has 56 possible characters (8 choose 5). For edge to edge decoding reasons, the Code 93 symbology standard defines only 48 unique symbols, and thus is able to define 47 characters in its character set plus a start/stop code. The 47 characters include the numeric characters 0–9, the alphabetic characters A–Z, some additional symbols and four shift codes.

The computer industry uses its own character encoding standards, namely, the American Standard Code for Information Interchange (ASCII). ASCII defines a character set containing 128 characters and symbols. Each character in ASCII is represented by a unique 7-bit code. Since Code 39 and Code 93 are limited to fewer than 50 characters, these standards are inadequate to uniquely represent each ASCII character. The four shift codes in Code 93, however, allow this standard to unambiguously represent all 128 ASCII characters. One drawback is that a series of two Code 93 symbols are required to represent a single ASCII character. Thus, bar code labels representing characters in the ASCII character set are twice as long as labels representing characters in the Code 93 character set.

New bar code symbology standards, such as Code 128, were developed to encode the complete ASCII character set, however, these standards suffer from certain shortcomings, including requiring shift codes or other preceding symbols to represent certain characters. All of these symbologies require increased processing time and overhead to process the entire ASCII character set.

The computer industry has grown beyond the limits of the ASCII character set. As the computer markets have grown, the need has also arisen to support additional languages not defined by the ASCII character set. New character sets were developed to accommodate clusters of characters in related languages. The original 7-bit ASCII character set was expanded to 8 bits thus providing an additional 128 characters or data values. This additional 128 set of data values (the "upper 128" or "extended ASCII") allowed for additional characters present in the related romance languages (i.e., French, German, Spanish, etc.) to be represented. The only linear symbologies capable of encoding 8-bit data are Code 128, and "Code 53", which is described in the inventor's U.S. Pat. No. 5,619,027, entitled "Single Width Bar Code Symbology With Full Character Set Utilizing Robust Start/Stop Characters and Error Detection Scheme." Both Code 128 and Code 53 encode 8-bit data by using single or double function shift characters, and thus require increased processing time and overhead, since every byte value must be analyzed before a data character is encoded.

As the computer markets grew internationally, however, even more languages were required to be included in the character set. Particularly, the Asian markets demanded a character set, usable on computers, which supported thousands of unique characters. To uniquely define each of these characters, a 16-bit encoding standard was required.

Several 16-bit encoding standards such as Unicode, JISC-6226-1983, and others have recently been developed. The Unicode character encoding standard is a fixed-length, uniform text and character encoding standard. The Unicode standard may contain up to 65,536 characters, and currently contains over 28,000 characters mapping onto the world's scripts, including Greek, Hebrew, Latin, Japanese, Chinese, Korean, and Taiwanese. The Unicode standard is modeled on the ASCII character set. Unicode character codes are consistently 16 bits long, regardless of language, so no escape sequence or control code is required to specify any character in any language. Unicode character encoding treats symbols, alphabetic characters, and ideographic characters identically, so that they can be used in various computer applications simultaneously and with equal facility. Computer programs using Unicode character encoding to represent characters, but which do not display or print text, can remain unaltered when new scripts or characters are introduced.

New computer operating systems are beginning to support these comprehensive 16-bit code standards, e.g., WINDOWS NT, manufactured by Microsoft Corporation of Redmond, Wash. The data collection industry, however, has failed to keep pace with the computer industry. No system currently exists for readily encoding the 16-bit computer character codes into bar code symbols. Therefore, there is a need to support these 16-bit computer character standards in the data collection industry, particularly for bar code symbologies.

Furthermore, most alphanumeric bar code symbologies are inefficient when used to encode a long series of numbers. When encoding a series of decimal numbers using Code 93 for example, the 26 bar code symbols reflecting the 26 alphabetic characters are not used. Therefore, there is a need to allow these alphanumeric bar code symbologies to more efficiently represent a long series of numbers.

SUMMARY OF THE INVENTION

The present invention solves the above problems and provides additional benefits. Under one embodiment of the present invention, a new linear symbology avoids complex methods of encoding 8-bit and 16-bit data by describing a simple byte encodation mode which works on any byte value uniformly. Under the exemplary embodiment, the present symbology is similar to the Code 93 symbology, and thus symbol characters are only nine modules long. Three symbol characters encode two 8-bit bytes. Thus, a byte requires approximately 13.5 modules, regardless of the byte value. Further reduction in the number of modules to encode data characters are permitted under the exemplary symbology, such as strings of digits or base Code 93 data characters.

Under an embodiment of the present invention, extended channel interpretation (ECI) numbers are officially encoded. As a result, a host computer system to which a reader can be coupled can uniquely decode the coded messages anywhere in the world regardless of the underlying character sets or applications employed by the host computer. Sixteen-bit characters are represented by three characters under the exemplary symbology, while in another mode, two 8-bit bytes are represented by three symbol characters. By representing two 8-bit bytes within three symbol characters, extended ASCII data characters can be officially encoded, as well as other relatively small international character sets, such as the ISO series 8859-1-8859-9.

In a broad sense, the present invention embodies a method of converting data characters to machine-readable symbols, where each symbol has a pattern of dark shapes and light spaces between the shapes. The method includes the steps of: (a) determining a plurality of character codes corresponding to a plurality of data characters, respectively, wherein each character code has 8 bits; (b) converting the plurality of character codes to a plurality of symbol values, wherein each of the plurality of symbol values are selected from a set of less than 256 symbol values; and (c) printing a plurality of symbols, wherein the plurality of symbols correspond to the plurality of symbol values, respectively.

The present invention also embodies a bar code structure comprising a plurality of adjacently positioned bars having spaces between the bars, groups of at least three bars and three spaces defining one of at least 54 individual data characters, each group having at least three bars and three spaces selected from a plurality of different widths that are integer multiples of first and second widths, respectively, where each group has a total width substantially equal to at least nine times the first or second width.

Furthermore, the present invention embodies a method of converting data characters to machine-readable symbols, where each symbol has a pattern of dark shapes and light spaces between the shapes. The method includes the steps of: (a) selecting a group of symbol values consisting of at least two symbol values; (b) selecting first or second symbol values, wherein the first symbol value indicates that the group of symbol values together correspond to a first mode, and wherein the second symbol value indicates that the group of symbol values together correspond to a second mode; and (c) printing a plurality of symbols, wherein the plurality of symbols correspond to the group of symbol values and the first or second value. The present invention also includes a method that includes the steps of: (a) selecting a group of symbol values consisting of at least two symbol values; (b) providing first and second symbol values, wherein the first symbol value indicates that the group of symbol values correspond to a portion of a two-dimensional symbol, and wherein the second symbol value indicates a selected position of the group of symbol values within the two-dimensional symbol; and (c) printing a plurality of symbols wherein the plurality of symbols correspond to the group of symbol values and a first and second symbol values.

BRIEF DESCRIPTION OF THE DRAWINGS

FIG. 2 is a table showing symbol values and associated symbol characters and data characters for an exemplary symbology under the present invention.

FIG. 5 is a table showing fill ASCII data characters encodable under symbology of FIG. 2.

DETAILED DESCRIPTION OF THE INVENTION

As used generally herein, the following definitions apply: "data characters" refers to human readable characters, including symbols, numeric characters, alphabetic characters, and ideographic characters, as well as non-readable data, such as function codes, shift codes, etc.; "numeric string" refers to a sequence of numeric characters, typically decimal digits; "character codes" refers to a code, typically numeric, which refers to a data character within a set of character codes and corresponding data characters, such as ASCII, where "8-bit code" refers to an extended ASCII code corresponding to a data character in the ASCII standard, and "16-bit code" or "16-bit character code" refers to a hexadecimal or decimal representation of a data character in a 16-bit character encoding standard, such as Unicode; "bar code symbology" refers to a set of machine-readable or symbol characters for uniquely representing a set of data characters; "symbol value" refers to a code such as an ordinal number representing a data character in a bar code symbology; "symbol character" refers to the unique geometric shapes or bar and space patterns used in a bar code symbology to represent particular data characters; "bar code standards" refers to a bar code symbology recognized by, or regularly used in, data collection applications (e.g., Code 128, Code 93); and, "counts" refers to a unique set of electrical signals produced when reading a symbol character corresponding to a data character in a bar code symbology.

For example, in the 16-bit character encoding standard Unicode, the data character "A" is represented by the 16-bit code "0041" in hexadecimal notation and "65" in decimal. The data character "A" has a symbol value of "10" in the bar code symbology Code 93. The symbol value 10 in Code 93 corresponds to a symbol character having a pattern of a two module width bar followed by: a single module width space, a single module width bar, a single module width space, a single module width bar, and a three module width space. The counts associated with the printing of this symbol are generally unique to each printer, and for a thermal printer, would represent the time intervals between transitions between bars and spaces to appropriately activate the printer's heating element as the thermal sensitive paper moved past it where the bars are positioned perpendicular to the direction of the label through the printer. Alternatively, the counts can indicate which dots or thermal-print elements to activate when the bars are parallel with the direction of the label through the printer.

Figure 1:
FIG. 1 is an example of a label having bar code symbol characters, with human readable characters, printed or read under an exemplary embodiment of the present invention.

A new bar code or linear symbology under an embodiment of the present invention, generally referred to herein as "93i," efficiently encodes bytes and words of data, to uniquely represent each 16-bit code in any 16-bit character code, encode ECI characters, as well as provide additional features described in detail herein. FIG. 1 shows an example of a label 101 printed or read under the 93i symbology. As shown in FIG. 1, the label 101 includes a series of bar code symbols which encode data characters, as well as corresponding human readable characters printed thereunder.

The 93i symbology is similar to Code 93. As a result, the 93i symbology encodes numeric, alpha-numeric, and the full 128 ASCII characters. Additionally, the 93i symbology encodes the extended ASCII characters and all international character sets, such as those represented by 16-bit character codes. The 93i symbology is continuous and employs a symbol structure, as described below, having six elements per symbol, with three bars and three spaces. Characters under the 93i symbology are not self-checking and symbol length is variable. The 93i symbology employs two mandatory symbol check characters. The 93i symbology employs the equivalent of 37 modules as non-data overhead.

Importantly, the 93i symbology permits data character density as follows: 5.4 modules per numeric digit, 9 modules per symbol character for alpha-numeric data, 13.5 modules for full ASCII and extended ASCII (as defined under the ISO8859 8-bit single-byte coded graphic character set standard), and 27 modules per Asian or 16-bit character code characters. Additionally, the present symbology supports the Extended Channel Interpretation (ECI) protocol (described below), and is fully compatible with the existing Code 93 symbology.

FIG. 2 shows the symbol character assignments for each data character in the 93i symbology. The "value" column in FIG. 2 represents the symbol value for each symbol character. As described herein, the symbol value is used to compute not only check characters, but is also employed in various data compression methods. The "character" column in FIG. 2 lists the alternating bar and space pattern for each symbol character, where a "1" corresponds to one module, "2" corresponds to two modules, etc. Each character begins with a bar. The "data" column in FIG. 2 represents a base data character corresponding to each symbol character, or the functionality of the symbol character. As shown in FIG. 2, symbol values 00–46, and their corresponding symbol characters and data characters match the corresponding symbol values, symbol characters, and data characters in the Code 93 symbology, as well as the start and stop symbol characters.

Unlike the Code 93 symbology, the 93i symbology employs 53 symbol values, rather than the 47 employed in the Code 93 symbology. Specifically, the 93i symbology adds symbol values 47–52. The symbol values 47–52, and corresponding symbol characters and data characters provide important functionality, and are described in detail below.

Figure 3:
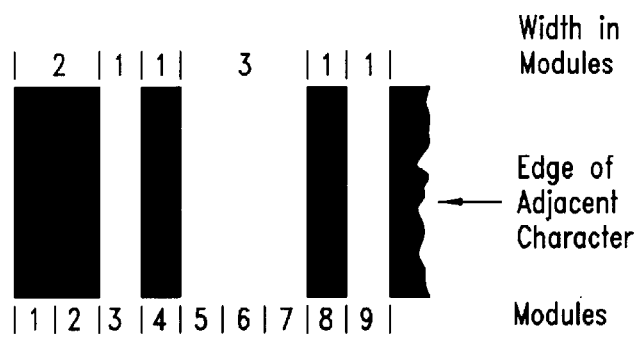
FIG. 3 shows an exemplary symbol character format.
Figure 4:
FIG. 4 shows the bar code symbol of FIG. 1, with each symbol character identified with its associated data character.

As shown in FIG. 3, the symbol character structure for each symbol character in the 93i symbology employs 3 bars and 3 spaces in 9 modules. Each bar or space is 1, 2, 3, or 4 modules in width. As in the Code 93 symbology, the 93i symbology employs a leading quiet zone (QZ) having a minimum width equal to ten times the X dimension, a start symbol character, one or more symbol characters encoding data characters, two symbol check characters (referred to as "C" and "K"), a stop symbol character, and a trailing quiet zone. FIG. 4 shows the symbol characters in the label 101 parsed into individual symbol characters, represented by short vertical lines between each symbol character, together with the corresponding data character for each symbol character.

As noted above, each 93i symbol contains two check characters that immediately precede the stop symbol character. All symbol characters having a value of 46 or less under a check algorithm in the 93i symbology employ a modulo 47 sum. However, if any symbol character has a value of 47 or greater, a modulo 53 sum is employed under the check algorithm for all symbol values in the symbol.

As with the Code 93 symbology, the check character "C" is computed based on the modulo sum of the products of the symbol values, as shown in FIG. 2, multiplied by a weighting sequence. The weighting sequence, from right to left (from the stop symbol character to the start symbol character), starting with the immediately preceding character, are in the repeating sequence 1,2,3, . . . 20, 1,2,3, . . . 20, 1,2, . . . . The check character "K" is produced based on the modulo sum of the products of the symbol values and a different weighting sequence, where the weights from right to left, beginning with the check character "C" are in the repeating sequence 1,2,3, . . . 15, 1,2,3, . . . 15, 1,2, . . . . As in the Code 93 symbology, the start and stop symbol characters are not included in the check character calculations.

For example, considering the symbol of FIG. 4, the data characters are, from left to right, 9,3,i,[ECI 16, {45272}. "[ECI 16] refers to the ECI value 000016, while "{45272} is the Asian character having the 16-bit code 45272 in the Unicode standard (which is pronounced approximately as "MA"). As used generally herein, the term "symbol" used alone refers to a collection of symbol characters, such as those shown in the label 101. The numeric data characters "9" and "3" are encoded directly, while the data character "i" must be encoded with a shift character (as described below). As used generally herein, the term "character" used alone refers to either a data character or its corresponding symbol value. The [ECI 16] data character is formed with two symbol characters, while the Asian character {45272} employs a Word Mode discussed below. Briefly, the value 45272 is encoded under the formula $(24*43^2)+(20*43)+36$. As a result, the symbol values for the resulting string of symbol characters for encoding the data is: [09][03][46][18][47][16][50][24][20][36]. Employing the above check character algorithm, with appropriate weighting, the calculation for the check character "C" from right to left is as follows.

"C"=(10×9+9×3+8×46+7×18+6×47+5×16+4×50+3×24+2×20+ 36)mod 53

=1321 mod 53

=49

Similarly, the check character "K" is calculated from a weighting which includes "C":

"K"=(11×9+10×3+9×46+8×18+7×47+6×16+5×50+4×24+3×20+2× 36+49)mod 53

=1639 mod 53

=49

As noted above, the 93i symbology employs several special characters.

As with the Code 93 symbology, the 93i symbology employs four shift characters [S1]–[S4], having symbol values 43–46, shown in FIG. 2. A shift character preceding a symbol value 10–35 represents a single full ASCII data character, as shown in the table of FIG. 5. The character combinations [S3]A through [S3]Z in the second column of FIG. 5 are valid and may be used under the 93i symbology to produce the ASCII characters associated with the single characters indicated. For example, the data character "Q" can be represented by the single symbol value [81] or by the two symbol values [S3][81]. The character pairs [S2] with either X, Y, or Z all encode the ASCII value DEL (delete).

The 93i symbology employs an ECI character [47], having a symbol value 47, that encodes information regarding prescribed meanings of bytes or subsequent data in a given symbol. The AIMI ECI Assignments document assigns ECI numbers and the meaning of bytes or data based on the ECI numbers. ECI numbers range from 000000 to 999999. For example, one ECI number represents the encoding of international character sets. The 93i symbology encodes ECI numbers by placing the ECI number anywhere within a symbol and following it by 1, 2, 3, or 4 symbol values selected from any of the 53 symbol values of FIG. 2.

A backslash character "\" (reverse solidus), having ASCII value 92 (see FIG. 5), is transmitted before the six digit ECI value. The backslash character behaves as an escape character to a host computer or system receiving the string of symbol values or data produced when a symbol is read. If a backslash character is to be placed within the encoded data, two backslash characters must be encoded within the symbol so that the host knows that a single backslash character is desired, rather than an ECI value. Likewise, if two backslash characters are desired, four backslash characters must be encoded for the host to know that two backslash characters are desired. The rules for encoding ECI numbers under the 93i symbology are presented below in Table 1.

Summarizing, for ECI numbers 0–899, bytes or data following such numbers are encoded directly even if the data could be compressible otherwise. For example, an ECI number 89 can represent the beginning of a particular type of encrypted data. The encrypted data which follows thereafter, while compressible, is encoded directly. However, if digits or full ASCII characters are encoded after an ECI number between 0–899, the Numeric Mode or Byte Mode (described below) can be used to thereby employ the lower 128 ASCII values and corresponding symbol values as shown in FIG. 5. If ECI numbers are encoded within a string of data characters, which are encoded under the Word Mode (described below), then the fill 128 ASCII values are employed with eight zeros prepended thereto. ECI numbers 900–999,999 are encoded as bytes in their most efficient mode, and the Word Mode character ([50]) is prohibited. For instance, for ECI number 950, if strings of 93i symbol values 0–9 need to be encoded, the Numeric Mode is employed, even though the values of the data characters may not correspond to the numbers employed under the mode specified by ECI 950.

Table 1 below summarizes rules for encoding ECI values under the 93i symbology. In Table 1 below, "div" refers to the integer division operator, while "mod" refers to the modulo division operator. "C1" refers to the most significant position, while "C4" refers to the least significant position.

TABLE 1

| ECI Value | Chars. | Value | Range |
| --- | --- | --- | --- |
| 000000–000043 | C1 | ECI_val | C1 = 0 to 43 |
| 000044–000096 | C1 | 44 | C1 = 44 |
|  | C2 | ECI_val - 44 | C2 = 0 to 52 |
| 000097–002905 | C1 | 45 | C1 = 45 |
|  | C2 | (ECI_val - 97)div 53 | C2 = 0 to 52 |
|  | C3 | (ECI_val - 97)mod 53 | C3 = 0 to 52 |
| 002906–999999 | C1 | ((ECI_val - 2906)div 148877) + 46 | C1 = 46 to 52 |
|  | C2 | ((ECI_val - 2906)div 2809)mod 53 | C2 = 0 to 52 |
|  | C3 | ((ECI_val - 2906)div 53) mod 53 | C3 = 0 to 52 |
|  | C4 | (ECI_val - 2906)mod 53 | C4 = 0 to 52 |

For example, to encode an ECI value of 000020, the following two character strings are used: [47][20] where [47] is the ECI symbol value 47, and [20] is the 93i character To encode an ECI value of 002000, the following steps are followed to obtain the three required characters:

[47][45][(ECI_val—97)div 53][(ECI_val—97)mod 53]=

[47][45][1903 div 53][1903 mod 53]=

[47][45][35][48]

Finally, to encode an ECI value of 200000, the following steps are followed to obtain the four required characters:

[47][(ECI_val—2906)div 148877+46][((ECI_val—2906)div 2809)mod 53][((ECI_val—2906)div 53) mod 53][(ECI_val—2906)mod 53]=

[47][197094 div 148877+46][197094 div 2809 mod 53][197094 div 53 mod 53][197094 mod 53]=

[47][1+46][70 mod 53][3718 mod 53][40]=

[47][47][17][08][40]

Symbol value 48 represents a numeric compaction mode in the Code 93 symbology, referred to herein as "Numeric Mode." Under the Numeric Mode, five numeric digits are compressed into three symbol characters. Thus, sequences of five or more digits should be compressed using the 5/3 Numeric Mode. The Numeric Mode character, symbol value 48, toggles into and out of the 5/3 numeric compression mode. Likewise, the Byte Mode and Word Mode characters, symbol values 49 and 50 respectively, can be used to exit from the Numeric Mode also. If a symbol ends while in Numeric Mode, Numeric Mode exiting character is unnecessary.

Under the Numeric Mode, five numeric digits are represented by three symbol characters, where the symbol characters each have a symbol value within the range of 0–47. The five digit numeric string is produced by the equation $$A*48^2+B*48+C \tag{1}$$

where A, B and C are 93i symbol values. When a string of digits is encoded which is greater than five, but not an exact multiple of five, the following four rules should apply. First, one digit more than a multiple of five in a string is directly encoded by a single symbol character (symbol values 00–09). Second, if the numeric string contains two more digits than a multiple of five, the last seven digits are separated into a set of four digits followed by a set of three digits, which are each represented as described by the third and fourth rules below. Third, if a numeric string contains three digits more than a multiple of five, the three digits at the end of the string are represented by two symbol characters according to the equation $$48*A+B \tag{2}$$

again, where A and B are 93i symbol values. Fourth, if a numeric string contains four digits more than a multiple of five, the last four digits are encoded in three symbol characters under equation (1) above, where the resulting value under equation (1) is between 100,000 and 109,999. Table 2 below shows exemplary 5, 6, 7, 8 and 9 digit strings, ranging from 12345 to 123456789, and resulting optimal symbol values determined under the Numeric Mode.

TABLE 2

| Exemplary Data | Optimal Resulting Symbol values |
|---|---|
| 12345 | [05][17][09] |
| 123456 | [05][17][09][06] |
| 1234567 | [43][45][02][11][39] |
| 12345678 | [05][17][09][14][06] |
| 123456789 | [05][17][09][46][16][37] |

The ECI value is used as part of the Numeric Mode, where the symbol value [47] does not invoke the ECI protocol, but instead is itself used in the 5/3 numeric compression method. If the ECI value [47] follows a string of digits encoded under the Numeric Mode, the Numeric Mode must first be exited before the ECI value is used.

Symbol value 49 represents a byte mode in the 93i symbology, referred to herein as "Byte Mode." Under Byte Mode, the 93i symbology efficiently encodes strings of full or extended ASCII data or straight byte data. A "byte" typically refers to an 8-bit set of data. Under the following equation (3), a double-byte, or two 8-bit bytes, are encoded for each of three symbol characters:

$$A*43^2+B*43+C \tag{3}$$

where A, B, and C are 93i symbol values between 0 and 42.

Under equation (3) two bytes having a combined value between 0 and 65,535 are encoded as two symbol characters (i.e., $2^{16}$=65,536). Values resulting from equation (3) between 65,536 to 75,535 encode four digits, while values 75,535 to 76,535 encoded three digits. As a result, the Byte Mode provides a 3- and 4-digit numeric compaction method to improve the information density for encoding strings of numeric characters while in Byte Mode. Values resulting from equation (3) between 76,536 and 79,506 are not defined, and cause a reader to fail a decode and output an error signal.

As with the Numeric Mode, Byte Mode is entered and exited using the Byte Mode symbol character, having symbol value 49. The Byte Mode can also be exited by employing the Word Mode symbol character (symbol value 50) or the Numeric Mode symbol character (symbol value 48). Additionally, a standard ASCII shift symbol character, having symbol values 43–46, causes a reader to exit Byte Mode and adds 128 to symbol values for the following characters. Thus, extended ASCII characters can be efficiently encoded after exiting Byte Mode. Similarly, if one character remains at the end of a symbol, while the preceding characters are in Byte Mode, the final character is decoded at its symbol value plus 128 (as if in extended ASCII). If a symbol ends while in Byte Mode, an exiting mode character, such as a final Byte Mode symbol character (symbol value 49) is unnecessary. If two characters remain at the end of the symbol, the two characters are decoded at their base symbol values, as if Byte Mode had been exited.

Several encoding strategies for improving symbol character encoding efficiency are permitted under the 93i symbology when in Byte Mode. For example, Byte Mode permits two extended ASCII data characters to be encoded as a single group of three symbol characters. For even numbers of full or extended ASCII data characters that end with an extended ASCII data character, groups of three symbol characters are employed under Byte Mode in the 93i symbology. For odd numbers of mixed full and extended ASCII data characters ending with an extended ASCII data character, the even number of characters are represented by groups of three symbol characters, and the last (or only) data character is encoded in one of two ways. First, if the last symbol character is an extended ASCII character, then it is encoded as a full ASCII character preceded by an appropriate shift character under FIG. 5. Second, if the last character is a single full ASCII character, then it is encoded directly and followed by the Byte Mode character. In both cases, the last character has a symbol value of 128 plus the value of the base character or shift character (symbol value 00–46, as shown in FIG. 2).

Table 3 below presents optimal encoding of various strings of data characters under the Byte Mode. Recall, symbol value [49] refers to the Byte Mode character, while [S] represents one of the four shift characters, having symbol values 43–46. In the third column of Table 3 below, characters "A" through "F" refer to any data character, having symbol values 00–42 in FIG. 2.

pression for 3 to 9 digit numeric strings within strings of full or extended ASCII characters. However, with a string of 10 digits or more, the Byte Mode should be exited and the Numeric Mode entered by simply providing the Numeric Mode character [48] within the string of full or extended ASCII characters.

If one, two, three or four standard or base 93i data characters are to be encoded within a string of full or extended ASCII characters, then such base data characters are treated as bytes. However, if five or more base data characters are to be encoded within the middle of full or extended ASCII characters, then it is more efficient to shift out of Byte Mode by first encoding the Byte Mode character [49], directly encode the five or more base data characters, and then reenter the Byte Mode with another Byte Mode character [49]. Table 4 below provides examples of strings of digits placed within strings of full or extended ASCII characters. In Table 4 below, the character types are separated by hyphens.

TABLE 3

| No. Chars. | Data Character Type | 93i Character String |
|---|---|---|
| 1 | Standard | A |
| 1 | Full ASCII | [S]A |
| 1 | Extended ASCII | [49][S]A or [49]A[49] depending on value |
| 2 | Extended ASCII - then exit | [49]ABC[49] |
| 3 | Full/Extended then Extended-exit | [49]ABC [S]A or [49]ABC A[49] |
| 4 | " | [49]ABC DEF[49] |
| 5 | " | [49]ABC DEF [S]A or [49]ABC DEF A[49] |
| . | . | . |
| . | . | . |
| . | . | . |

When strings of numeric data characters are to be encoded between full ended ASCII data characters, additional encoding strategies are available under the 93i symbology to improve symbol character densities. If one or two numeric data characters are encoded between full or extended ASCII characters, then the one or two numeric characters are

TABLE 4

| Data Character Number & Type | 93i Character String |
|---|---|
| 2 Extended/Full - 1 digit/Base - 1 Extended | [49]ABC DEF[49] |
| 2 Extended/Full - 1 digit/Base - 2 Extended | [49]ABC DEF [S]A or A[49] |
| 2 Extended/Full - 2 digits/Base - 1 Extended | [49]ABC DEF [S]A or A[49] |
| 2 Extended/Full - 2,3,4 digits/Standard - 2 Extended | [49]ABC DEF GHI[49] |
| . | . |
| . | . |
| . | . |
| 2 Extended/Full - 10 digits - 2 Extended | [49]ABC[48]DEF GHI[49]JKL[49] |
| 2 Extended/Full - 5 Base - 2 Extended | [49]ABC[49]DEFGH[49]JKL[49] | treated as single full ASCII characters, having ASCII values 48 to 57 as shown in FIG. 5, depending upon the number of digits. If three to nine numeric data characters are encoded between full and extended ASCII characters, then groups of three and four digits are compressed under values 65536–75535 and 75536–76535 of the Byte Mode. In other words, the Byte Mode provides satisfactory numeric com- Symbol value 50 represents a word mode in the 93i symbology, referred to herein as "Word Mode." Under the Word Mode, three symbol characters are grouped so that their corresponding three symbol values encode a single 16-bit value. Thus, three symbol characters can encode Asian characters or 16-bit character codes. Character codes up to 65,536 are encoded under equation (3) above.

Exiting from the Word Mode is performed with either the Word Mode character [50], the Byte Mode character [49], or the Numeric Mode character [48]. Additionally, as with the Byte Mode, a shift character S1–S4, followed by a single base character, or a single symbol character and the Word Mode character exit from the Word Mode and add 128 to the values of single characters. If the symbol ends while in Word Mode, an exit character is unnecessary. Where immediately preceding symbol characters were encoded under the Word Mode, two symbol characters at the end of a symbol are decoded at their base value. If the host employs an 8-bit processing architecture, then the reader in Byte Mode transmits two consecutive bytes. If the host, however, employs 16-bit architecture (e.g., double-bytes processed in parallel), then the reader can employ Word Mode to transmit a single double-byte word of 16 bytes to the host.

Again, several strategies for increasing encoding efficiency are permitted in the 93i symbology when in Word Mode. For example, numeric strings enclosed within characters encoded under the Word Mode are handled in a manner similar to the Byte Mode described above, except strings having value 76,536 to 76,635 encode two digits. If a single digit is enclosed within Word Mode characters, the single digit is represented by [43] N, where [43] is the first shift character S1, and N is the numeric digit. Two, three or four numeric digits enclosed within Word Mode characters are simply represented by the appropriate Word Mode value, in the same way as Byte Mode. With five numeric digits enclosed within Word Mode characters, the Word Mode should be exited and the Numeric Mode entered by simply encoding the Numeric Mode character [48]. When a single base, full or extended ASCII character is enclosed within Word Mode characters, the explicit Word Mode character values are employed to represent the base, extended or full ASCII characters. If two or more fill or extended ASCII characters are encoded within Word Mode characters, the Word Mode should be exited and the Byte Mode entered by again simply inserting the Byte Mode character [49]. Table 5 below presents several examples of encoding strings of digits or other data characters efficiently under the 93i symbology under Word Mode. In Table 5 below, the value "25543" and "18776" refer to two different Unicode 16-bit codes. Character types in the second column are separated by hyphens.

Symbol value 51 represents a function 1 (FNC1) character in the 93i symbology. The FNC1 character in the first or second positions in a symbol signifies compliance of that symbol with a particular application standard, as is known by those skilled in relevant art. The FNC1 character in the first position automatically invokes the Numeric Mode, as described above. To encode alphabetic characters (e.g., ASCII characters) immediately following the FNC1 character in the first position, the Numeric Mode character [48] is required to return to the base 93i character set of FIG. 2. The FNC1 character in the second position indicates that double-bytes are transmitted, as in the Word Mode. The FNC1 character in the third or subsequent positions corresponds to a transmitted group separator (<GS>) character. If the FNC1 character appears within a symbol, while the symbol is in Numeric, Byte or Word Mode, the FNC1 character is interpreted as if the Numeric, Byte or Word Mode ended, a group separator <GS> character was transmitted and then the previous mode is reentered (i.e., Numeric, Byte or Word Mode).

If a symbol is printed with a leading space (symbol value 38), then a reader stores the read symbol in a buffer, together with subsequent symbols having leading spaces, until a symbol without a leading space is encountered. At this time, the entire contents of the buffer, i.e., all read symbols in the buffer, are transmitted, as in the Code 93 symbology. As a result, a long symbol can be partitioned into several smaller symbols, each of the smaller symbols (except the last) having a leading space data character. If a leading space is desired as the first data character in a symbol, without invoking this "leading space append" feature, the Byte Mode should be used.

As explained below with respect to an exemplary decoding routine, a reader that reads and decodes 93i symbol characters does not transmit the start or stop characters or check characters. As with the Code 93 symbology, all data characters are transmitted, while a character pair beginning with one of the shift characters [S1]–[S4] causes only the single ASCII character in FIG. 5 to be transmitted. Since the 93i symbology can encode Asian and other 16-bit character codes, a reader will transmit 16-bit words when in Word Mode. When a reader encounters a Word Mode character [50] within a symbol, together with subsequently full or extended ASCII characters, or base 93i data characters, the

TABLE 5

| Values | Type | 93i Characters |
| --- | --- | --- |
| 25543 | Unicode | [50]ABC[50] |
| 25543, 18776 | Unicode | [50]ABC DEF[50] |
| 25543, 3, 18776 | Unicode-digit-Unicode | [50]ABC [43]3 DEF[50] |
| 25543, 3,7, 18776 | Unicode-2 dig-Unicode | [50]ABC DEF GHI[50] |
| 25543, A, 18776 | Unicode-Std/byte-Unicode | [50]ABC DEF GHI[50] |
| 25543, AB, 18776 | Unicade-2 Std-Unicode | [50]ABC[50]AB[50]DEF[50] |
| 25543, 233, 231, 18776 | Unicode-2 byte-Unicode | [50]ABC[49]ABC[50]DEF[50] |

Any standard 16-bit data character encoding standard can be used by the present invention, for example, Unicode, JISC-6226-1983, Big Five (BF), or KSC 5609-1987. The JISC-6226-1983 standard is the Japan Industrial Standard Character set, mapping the kanji and katakana data characters into 16-bit codes. This data character standard is similar to Unicode, which, as noted above, includes the kanji and katakana data characters, among others. However, each data character in the JISC-6226-1983 standard is assigned a different 16-bit code for the equivalent data character in the Unicode standard.

reader transmits all ASCII values 0–255 as double-bytes, i.e., a first byte consisting of 8 zeros, while the second byte represents the encoded ASCII data. If a symbol does not use the Word Mode character [50], and a reader is not configured to transmit double-bytes, all data characters in a 93i symbol are read and transmitted as bytes, as under the Byte Mode. Thus, use of transmitted data as single bytes automatically provides more efficiently coded and transmission within a reader under the 93i symbology if the reader employs 8-bit architecture. When the ECI character [47] exists in a symbol, the same procedures are followed as with the Word Mode character, but only within the ECI data character that contains one or more Word Mode characters as described below.

The 93i symbology preferably employs symbology identifiers. Symbology identifiers in the 93i symbology are prefixes to transmitted data depending upon the nature of the data encoded in a symbol. In other words, the symbology identifier is a uniform methodology for reporting the particular symbology read and options to set in the reader, as well as any other features of the symbology that are encountered within a particular symbol. The AIM USA Symbology Identifier Guideline describes symbology identifiers in greater detail. Readers can be programmed to add the symbology identifier prefix to a given data message which is transmitted from the reader. The particular symbology identifier for the 93i symbology is the same as the symbology identifier for Code 93, i.e., "]G." A modifier data character or characters are then added according to the following rules presented in Table 6 below.

symbol value, can indicate that one symbol forms the upper-left portion of the two-dimensional symbol, while the unassigned symbol with a second symbol value indicates that another of the four symbols corresponds to the lower-right corner of the two-dimensional symbol. The check characters for the last symbol in the structured append two-dimensional symbol are check characters for the entire two-dimensional symbol.

An example of data transmitted from a reader based on the symbol of FIG. 1 will now be presented. The symbol of FIG. 1 encodes the string, "9, 3, i, ECI 16, {45272}" and the data transmitted would be:

]G7\000003 9 3 ⁁000016 45272 which in bytes is:

93, 71, 55, 92, 48, 48, 48, 48, 48, 51, 57, 51, 105, 92, 48, 48, 48, 48, 49, 20 54,176,216.

TABLE 6

| Mod. Char. | Rule |
|---|---|
| 0 | Code 93 symbol decoded. i.e.. no data characters having symbol values greater than 46 are present in the symbol. |
| 1 | 93i symbol decoded, single bytes transmitted (Word Mode character not present in the symbol). |
| 2 | FNC1 character in the first position, single bytes transmitted. |
| 3m | FNC1 character in the second position, followed by the value of the preceding character, single bytes transmitted. |
| 4 | 93i symbol decoded, double bytes transmitted, including symbology identifiers. |
| 5 | FNC1 character in the first position, double bytes transmitted. |
| 6m | FNC1 character in the second position, followed by the value of the preceding character, double bytes transmitted. |
| 7 | ECI character present, bytes transmitted with "\NNNNNN" ECI value included in the transmission, and encoded "\" characters doubled. For ECI values 0–900, double-bytes are transmitted within the ECI when a Word Mode character is present, and bytes otherwise. For ECI values 901–999999, the Word Mode character is not encoded and all characters are transmitted as bytes. |
| 8 | ECI character present, all characters are transmitted as double bytes, including the ECI sequence. |
| 9 | FNC1 character in the first position, ECI character present and single bytes transmitted. |
| Am | FNC1 character in the second position, followed by the value of the preceding character, ECI character present and single bytes transmitted. |
| B | FNC1 character in the first position, ECI character present and double bytes transmitted. |
| Cm | FNC1 character in the second position, followed by the value of the preceding character, ECI character present and double bytes transmitted. |

The modifier character "m" corresponds to particular application standard followed and registered with AIM. The modifier character "m" occurs only when the FNC1 character is in the second position.

Symbol value 52 is an unassigned data character. Symbol value 52 could be used as a single character flag for multirow ordered concatenation or structured append. In other words, the unassigned symbol value 52, together with one or more subsequent symbol values, can be employed in several separate symbols to designate a complete two-dimensional symbol. For instance, the flag may be followed by a single character whose value is made up of the position and the size of the symbol. The unassigned character 52, together with the one or more subsequent symbol values, indicate a precise location of each symbol within a two-dimensional area to effectively form a two-dimensional symbol. For example, four symbols can together form a single two-dimensional symbol having two rows. The unassigned symbol value 52, together with a first, subsequent Note that the symbology identifier "]G7" transmitted initially with the data includes the modifier character "7" that indicates, under Table 6 that an ECI character is present and bytes are transmitted with "\NNNNNN" ECI value included in the transmission. If the reader were configured to transmit all single bytes as double bytes, and double byte characters unchanged, the Symbology Identifier would change to "]G8", and the following byte sequence would be transmitted from the reader:

0, 93, 0, 71, 0, 56, 0, 92, 0, 48, 0, 48, 0, 48, 0, 48, 0, 48, 0, 51, 0, 57, 0, 51, 0, 105, 0, 92, 0, 48, 0,48, 0, 48, 0, 48, 0, 49, 0, 54, 176, 216.

Because the symbol contains an ECI character, Symbology Identifiers must be used, and the reader cannot decode a symbol without transmitting the Symbology Identifier characters. However, if the ECI characters "\000003" and "\000016" were not encoded in the symbol, then it would be up to the host receiving the transmitted data from the reader to interpret the transmitted message. In that case, where a Word Mode character is encoded in the symbol, the reader must transmit the symbol as double bytes, and if Symbology Identifiers were enabled, the correct prefix would be "]G4." Similarly, if a Word Mode character were not present in the symbol, but the reader were configured to transmit all single bytes as double bytes and all double byte characters unchanged, the Symbology Identifier would still be "]G4". Consequently, an encode string "9, 3, i, {45272}" would be transmitted as:

]G4 9 3 i 45272 which in bytes is:

0, 93, 0, 71, 0, 52, 0, 57, 0, 51, 0, 105, 176, 216.

Figure 6:
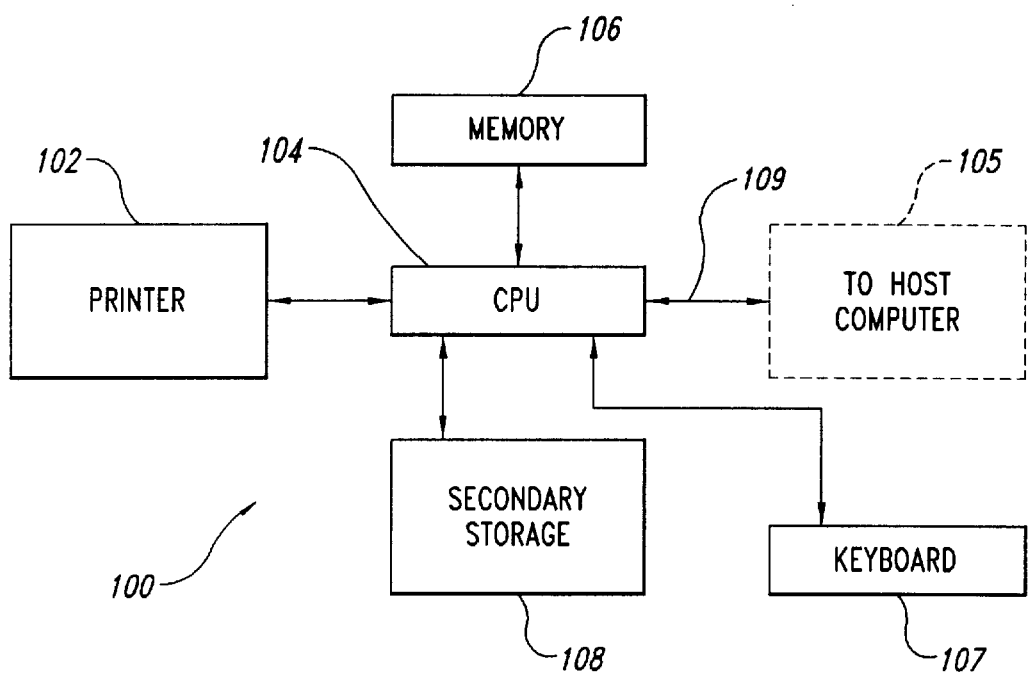
FIG. 6 is a block diagram of a bar code symbol printing apparatus of the present invention.

FIG. 6 shows an exemplary symbol character printing apparatus 100. The apparatus 100 consists of a printer 102, a central processing unit (CPU) 104, a memory 106, a keyboard 107 and a secondary storage 108. The printer 102 is of a type generally known which can print bar codes and human readable data characters. Those skilled in the art may select from any such printers which are suitable for use in the present invention. The CPU 104 is electrically coupled to a host computer, or other apparatus or applications, by a port or line 109. The CPU 104, executing a routine (FIG. 2) stored in the memory 106 and/or the secondary storage 108, converts a 16-bit data character code into counts which are sent to the printer 102. The printer 102 interprets these counts and converts them into printed symbol characters, typically in the form of a bar code label. A "label" generally refers to any paper, cloth, plastic, metal or other pliable or rigid material suitable for having one or more symbol characters and/or data characters printed or formed thereon. Those skilled in the relevant art, however, will recognize that the term "label" also refers to any symbol characters printed on an object, such as packaging for a consumer product, or relief formed on an object. The printed label can include both symbol characters and the corresponding human readable data characters. The label 101 of FIG. 1 is an example of a label printed or read under embodiments of the present invention.

Figure 7:
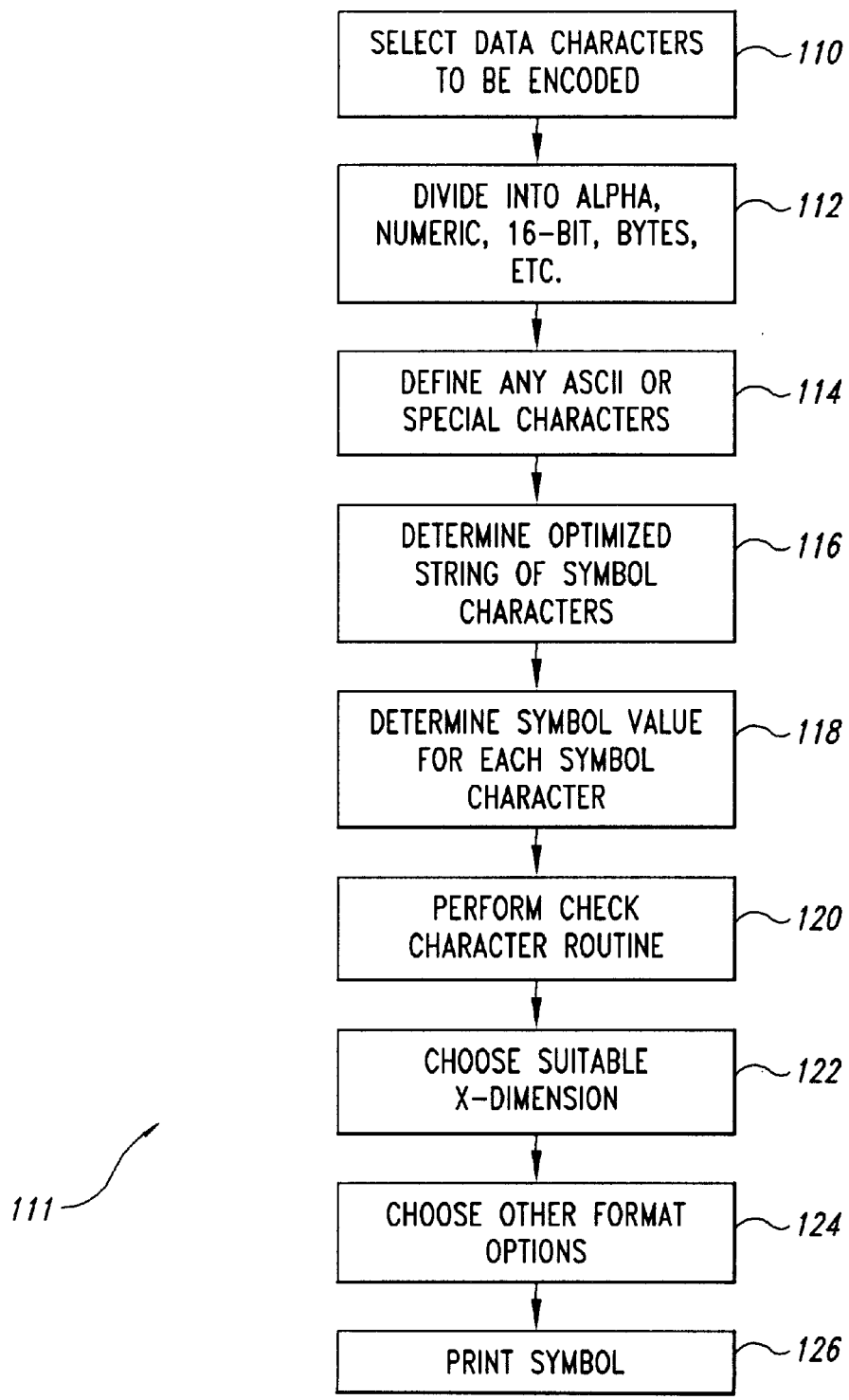
FIG. 7 is an exemplary flow chart showing the basic steps performed by the printing apparatus of FIG. 6 for printing bar code symbols under the exemplary embodiment.

FIG. 7 shows exemplary steps performed by the printing apparatus 100 of FIG. 6 under a routine 111 for printing a bar code label having multiple symbol characters and with corresponding data characters. In step 110, a string of data characters are selected, input or determined, for example, such as input using the keyboard 107. The string of data characters may also be input to the CPU 104 over the line 109 from the host computer 105. When a key is depressed on the keyboard 107, the keystroke is converted into a "scan code" which is transmitted from the keyboard to the device to which the keyboard is connected (e.g., the printing apparatus 100 or the host computer 105). This scan code represents the particular key of the keyboard which has been depressed, and is unrelated to any particular character or value in a data character set, such as ASCII or Unicode.

In step 112, the CPU 104 divides or parses the selected characters into various sets of data characters, such as alphabetic characters, numeric characters, 8-bit bytes, 16-bit words or characters, etc. Data parsing techniques are well known in the relevant art. In step 114, the CPU 104 defines any special characters, such as shift characters [S]–[S4], mode characters, such as numeric, byte and word mode characters [48], [49] or [50], respectively, etc. Additionally, in step 114, the CPU 104 determines whether any ECI numbers are to be encoded in the symbol.

In step 116, the CPU 104 determines an optimized string of symbol characters based on the selected data characters. For example, if five consecutive data characters are numeric, then the CPU 104 determines that the Numeric Mode should be employed to reduce the number of symbol characters and thereby increase information density of the resulting symbol. CPU 104 in step 116 employs the rules and suggestions presented above for increasing information density in a symbol (e.g., as shown in Tables 3 and 4).

In step 118, the CPU 104 determines the symbol value for each data character. A table of data characters and their corresponding symbol values is preferably stored in the secondary storage 108, along with the counts for the corresponding symbol characters, such as the tables of FIGS. 2 and 5. Alternatively, the symbol values can be automatically calculated from knowledge of the data characters. The CPU 104 in step 118 encodes selected data characters into symbol characters selected from the table of FIG. 2 based on the appropriate routine described herein. For example, if the CPU 104 encounters a string of three or five digits, the CPU employs equations (1) and (2), respectively, which are described above. If bytes are to be encoded, then the CPU 104 employs the equation (3).

In step 120, the CPU 104 generates the check characters "C" and "K" by employing the above-described check character algorithm. In step 122, the CPU 104 chooses a suitable X-dimension for the symbol based on, in part, the number of symbol characters to be printed. In step 124, the CPU 104 chooses other format options, such as printing the symbol with the human readable data characters, or other format options known by those skilled in the relevant art. In step 126, the CPU 104 outputs the appropriate codes and other signals to the printer 102, which in turn prints the symbol as a series of symbol characters (and possibly data characters) to form the bar code label.

Figure 8:
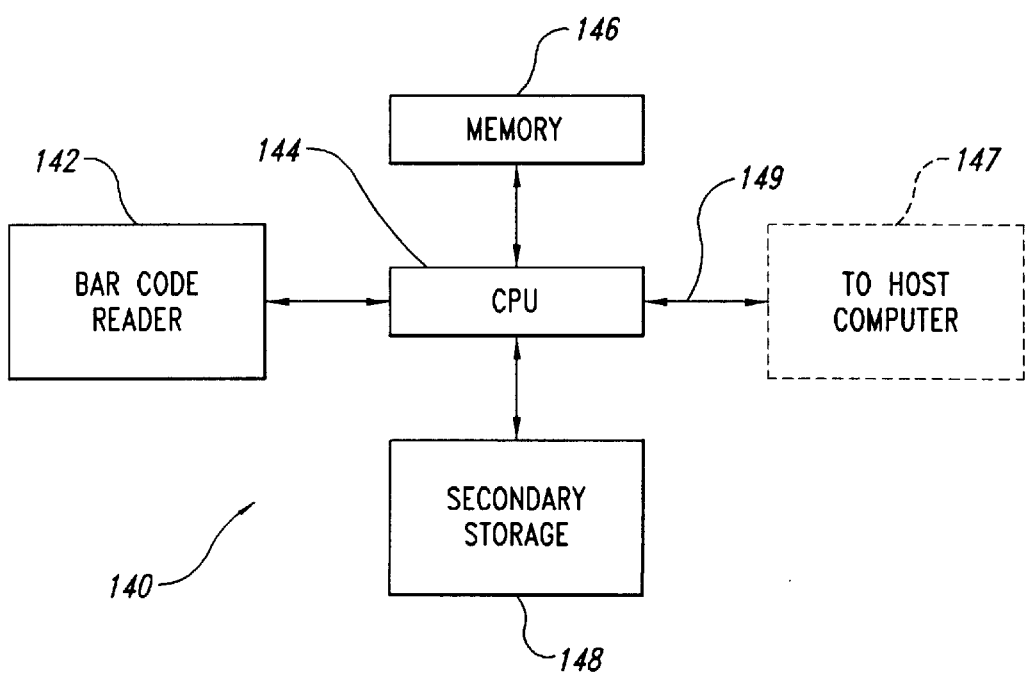
FIG. 8 is a block diagram of a bar code symbol reading apparatus of the present invention.

The 93i symbology can also be readily read using a bar code reading apparatus such as a bar code reading apparatus 140, shown in FIG. 8. The reading apparatus 140 has a standard bar code reader 142. The bar code reader 142 includes an electro-optical device 143 such as a laser scanner, rasterizing laser, or wand-based optical transducer. Alternatively, the electro-optical device 143 in the reader 142 can include a one- or two-dimensional CCD, semiconductor array, vidicon, or other area imager capable of converting received light into electrical signals. The electro-optical device 143 in the reader 142 can also include a light source such as an LED, flash bulb, infrared light source, or other light-emitting element. As used generally herein, the term "reader" refers to any device capable of converting modulated light received from a bar code into electrical signals. Readers are known by those skilled in the art, and any such reader suitable for use in the present invention can be selected. The data read from the bar code reader 142 is input to a CPU 144. A memory 146 and a secondary storage 148 are coupled to the CPU 144. The data input to the bar code reader 142 is processed by the CPU 144 and output to a host computer 147, or other apparatus or applications, by a port or line 149.

Figure 9:
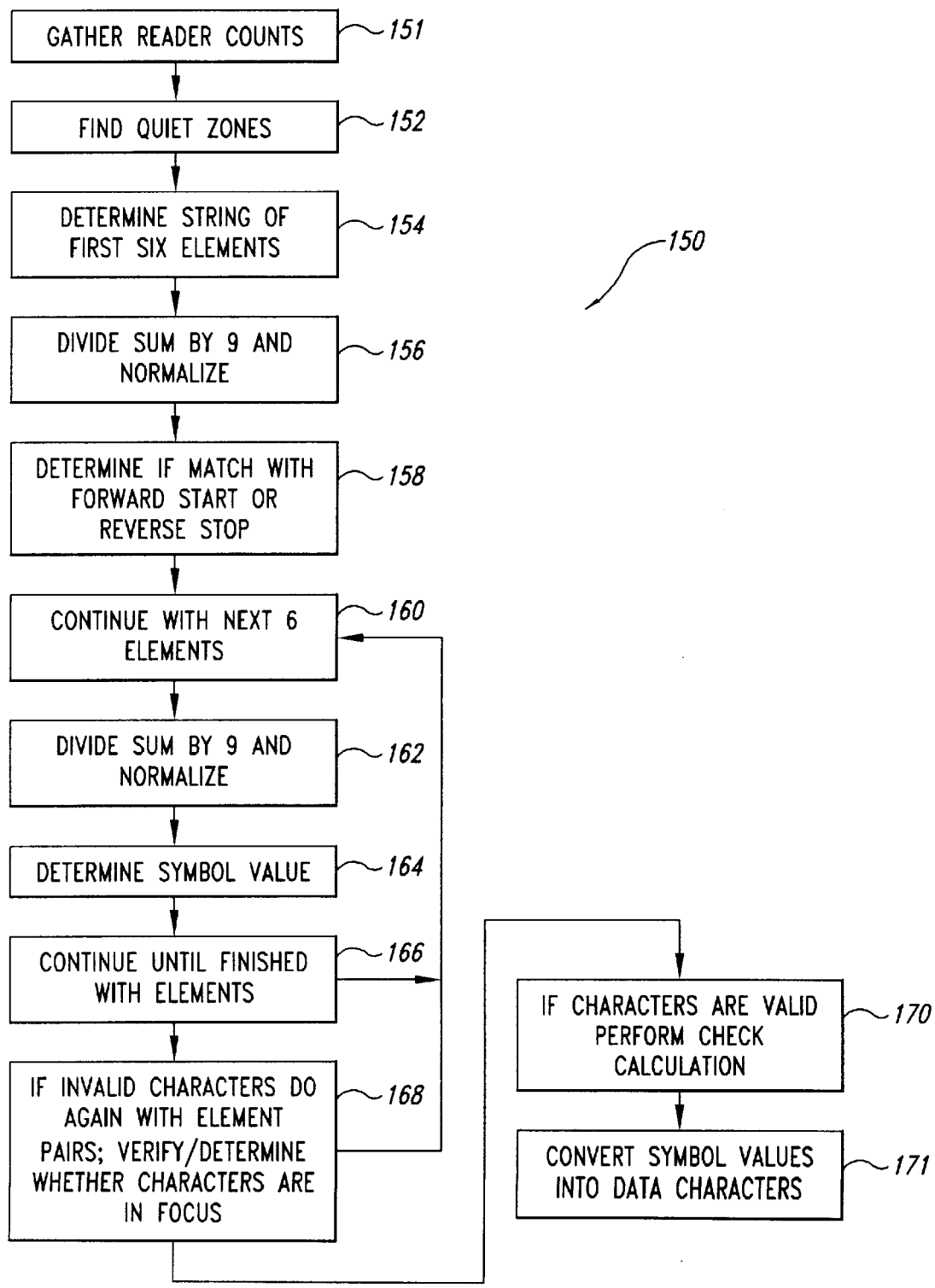
FIG. 9 is a flow chart showing the basic steps performed by the reading apparatus of FIG. 8 for reading bar code symbols under the exemplary embodiment.

FIG. 9 shows the steps performed under a routine 150 by the reading apparatus 140 of FIG. 8 for reading bar code symbols having symbol characters from the present symbology. In step 151, the bar code reader 142 scans or images the symbol characters of a bar code label and determines the width of the elements, e.g., by determining a series of counts. As is known by those skilled in the art, the transitions between bars in the symbol characters, together with a timer within the reading apparatus 140, determine the counts of the symbol characters read. The counts in turn are used to determine the widths of elements in a given symbol. In step 152, the CPU 144 analyzes the counts, to locate the quiet zones on both sides of the symbol.

In step 154, the CPU 144 selects the first 6 counts, which represent the first string of 6 element widths. In step 156, the CPU 144 divides the first six counts by 9 and normalizes the result to estimate the widths of the individual elements. In step 158, the CPU 144 compares the widths of the first 6 elements to the string of widths for the start character and with the reverse string of widths for the stop character. If the last 6 elements in the string correspond to the 6 elements from the start character, but in reverse, the CPU 144 recognizes that the symbol has been scanned in reverse, and therefore recognizes that the symbol is to be read from right to left (as opposed to the traditional left to right).

In step 160, the CPU 144 selects the next 6 elements, and in step 162, divides the sum of the elements (counts) by 9 and normalizes the result. In step 164, the CPU 144 determines the symbol value for the selected 6 elements. In step 166, the CPU 144 determines if the label contains any additional elements and if so, loops back to step 160 to perform the steps 160 through 164 again until all of the symbol characters have been converted into symbol values.

In step 168, the CPU 144 determines if any invalid/undecodable symbol characters have been generated. If some symbol characters are determined to be undecodable, then the routine loops back to step 160 and the CPU 144 performs other known decode methods, such as edge-to-edge (element pairs) decoding for individual elements in the symbol. Alternatively, in step 168, the CPU 144 performs bar-to-bar or space-to-space comparisons, or Factor R decoding methods, known to those skilled in the art.

In step 168, the CPU 144 can also verify or determine whether the symbol characters are in focus. The CPU 144 analyzes the signals produced by the bar code reader 142 for the symbol characters to determine whether the CPU can recognize the wide elements but fail to recognize the one-wide elements. If the CPU 144 cannot recognize the one-wide elements in one or more symbol characters, the CPU aborts the decode routine, provides unfocused data to the CPU, or performs other functions such as alerting the user that the symbol is not in focus. If the CPU 144 is sufficiently programmed, it can decode the unfocused data based on the present inventor's U.S. Pat. Nos. 5,486,689, 5,514,858, 5,539,191 and/or U.S. patent application Ser. No. 08/493,669, filed Oct. 12, 1996.

If the symbol is in focus or if the CPU 144 decodes the unfocused data, so that all of the symbol values are valid (i.e., map to data characters) then in step 170, the CPU performs the check calculation based on the last two symbol characters. If the check characters check under the above algorithms, then in step 171, the CPU 144 converts the symbol values into data characters based on a look-up table, by retrieving the appropriate data characters from the memory 146 or the secondary storage 148 depending upon where the appropriate data is stored. The data characters can then be displayed, or used in other applications by the CPU 144, or output over the line 149 to the host computer 147. In step 171, the CPU 144 also interprets any shift or Mode symbol values, such as symbol values 48–50 for the Numeric, Byte and Word Modes, respectively. When the CPU 44 encounters one of the Mode characters, or other special characters (symbol values 43–52), the CPU enters the appropriate mode or decodes the symbol values as described above. Alternatively, the CPU 144 can simply output the symbol values over the line 149 to the host computer 147, which in turn performs the conversion into the corresponding data characters.

Although specific embodiments of, and examples for, the present invention have been described above for illustrative purposes, various equivalent modifications may be made without departing from the spirit and scope of the invention. For example, if the memory 106 or 146 is sufficiently large to contain all data required by the CPU 104 or 144 for encoding, decoding, printing or reading bar code labels, the secondary storage 108 or 148 is unnecessary and thus eliminated. Alternatively, the data required by the CPU 104 or 144 may be contained in the secondary storage 108 or 148, thus eliminating the need for a large memory 106 or 146 or the need for this memory entirely. Regarding the 93i symbology, the symbol characters can be allocated to different data characters than as described above with respect to FIG. 2. Error correction characters can be added to any label to provide the ability to correct errors in the label. The FNC1 character [51], or the unassigned symbol character [52] can be used to latch into a mode for encoding other sets of data characters. For example, where the Word Mode character [50] can be used to encode the Unicode characters, while the unassigned character [52] can latch to encode the JISC-6226-1983 characters. Additionally, the present invention can incorporate the teachings of the U.S. Patents and/or applications described herein to provide additional benefits and functionality. The U.S. Patents and applications cited above are incorporated herein by reference as if set forth in their entirety.

These and other changes can be made to the invention in light of the above detailed description. In general, in the following claims, the terms should not be construed to limit the invention to the specific embodiments disclosed in the specification and claims, but should be construed to include all apparatus, methods and symbologies for directly encoding various data characters, such as 8-bit bytes, 16-bit character codes, ECI numbers, etc. Accordingly, the invention is not limited by the disclosure, but instead its scope is to be determined entirely by the following claims.

What is claimed is:

1. A method of converting data characters to machine-readable symbols, each symbol having a pattern of dark shapes and light spaces between the shapes, the method comprising:

determining at least first and second character codes corresponding to data characters, wherein each character code has 8 bits;

converting the first and second character codes to first, second and third symbol values;

printing first, second, third symbol characters, wherein the first, second and third symbol characters correspond to the first, second and third symbol values, respectively; and printing an additional symbol character, wherein the additional symbol character indicates that the first, second and third symbol characters correspond to at least one character code having 8 bits when the combined first, second and third symbol values compute under a formula to a computed value that is less than a predetermined value, and correspond to at least one string of digits if the computed value is greater than the predetermined value.

2. The method of claim 1 wherein printing includes printing first, second and third symbol characters selected from a symbology having three shapes and nine modules per symbol character.

3. The method of claim 1 wherein the acts of determining, converting and printing are repeated for each pair of data characters in a selected string of data characters, wherein each data character has a corresponding 8 bit character code.

4. The method of claim 1, further comprising printing an additional symbol character, wherein the additional symbol character indicates that subsequent symbol characters correspond to at least one 16-bit character code selected from the Unicode standard.

5. The method of claim 1, further comprising:
selecting a first number of digits;
converting the number of digits to a second number of symbol values, the second number being less than the first number;
printing the second number of symbol characters corresponding to the symbol values; and
printing an additional symbol character, wherein the additional symbol character indicates that the second number of symbol characters correspond to digits.

6. The method of claim 1, further comprising:
selecting a number corresponding to preselected data interpretable by a computer;
converting the number to at least one selected symbol value;
printing at least one selected symbol character corresponding to the at least one selected symbol value; and
printing an additional symbol, wherein the additional symbol indicates that the at least one selected symbol corresponds to one of a plurality of predetermined numbers.

7. The method of claim 1, wherein the printing an additional symbol character includes printing symbol characters corresponding to character codes having 8 bits when the computed value is less than approximately 65,536.

8. The method of claim 1 wherein printing an additional symbol character includes printing symbol characters corresponding to four digits when the computed value is between approximately 65,536 and 75,535, and three digits when the computed value is between approximately 75,535 and 76,535.

9. The method of claim 1 wherein the printing an additional symbol character includes computing values under the following formula:
$A*43^2+B*43+C$, where A, B and C correspond to the first, second and third symbol values, respectively, and have values between 0 and 42.

10. A method of converting data characters to machine-readable symbols, each symbol having a pattern of dark shapes and light spaces between the shapes, the method comprising:
determining a plurality of character codes corresponding to a plurality of data characters, respectively;
converting the plurality of character codes to a plurality of symbol values, wherein each of the plurality of symbol values are selected from a set of less than 256 symbol values;
printing a special symbol character; and
printing a plurality of symbol characters, wherein the plurality of symbol characters correspond to the plurality of symbol values, respectively, and wherein the plurality of symbol values correspond to at least one character code having at least 8 bits if a calculated numeric value, for the plurality of symbol values, has a predetermined relationship to at least one predetermined value, and wherein the plurality of symbol values correspond to a string of numeric digits if the calculated value has another predetermined relationship to the predetermined value.

11. The method of claim 10 wherein printing a plurality of symbol characters includes printing symbol characters corresponding to character codes having at least 16 bits when the calculated value is less than approximately 65,536.

12. The method of claim 10 wherein printing the plurality of symbol characters includes printing symbol characters corresponding to two digits when the calculated value is between approximately 76,536 and 76,635.

13. The method of claim 10 wherein the predetermined relationship is a less than relationship, and wherein the another predetermined relationship is a greater than relationship.

14. The method of claim 10 wherein printing includes printing a plurality of symbol characters selected from a symbology having three shapes and nine modules per symbol character.

15. The method of claim 10, further comprising printing an additional symbol character, wherein the additional symbol character indicates that each group of proximate symbol characters correspond to one 16-bit word.

16. The method of claim 10, further comprising:
selecting a first number of digits;
converting the first number of digits to a second number of symbol values, the second number being less than the first number;
printing the second number of symbol characters corresponding to the second number of symbol values; and
printing an additional symbol character, wherein the additional symbol character indicates that at least the second number of symbol characters correspond to digits.

17. The method of claim 10, further comprising:
selecting a number corresponding to preselected data interpretable by a computer;
converting the number to at least one selected symbol value;
printing at least one selected symbol character corresponding to the at least one selected symbol value; and
printing an additional symbol, wherein the additional symbol indicates that the at least one selected symbol corresponds to one of a plurality of predetermined numbers.

18. The method of claim 10, further comprising:
employing a first check character mode if any of the plurality of symbol values have a first range of values;
employing a second check character mode if any of the plurality of symbol values have a second range of values; and
computing at least a first check value under the first or second check character modes based on the plurality of symbol values.

19. The method of claim 10 wherein printing includes printing several symbols selected from a standard bar code symbology.

20. A method of converting data characters to machine-readable symbols, each symbol having a pattern of dark shapes and light spaces between the shapes, the method comprising:
selecting a first number of characters or digits;
converting the first number of characters or digits to a second number of symbol values, the second number being less than the first number; and
printing a number of symbol characters corresponding to the second number of symbol values, wherein groups of two or more of the second number of symbol values provide a computed value under a formula, and wherein the groups of two or more of the second number of symbol values correspond to at least one character if the computed value has a predetermined relationship to a predetermined number, and correspond to compressed numeric digits if the computed value has another predetermined relationship to the predetermined value.

21. The method of claim 20, further comprising:

printing a mode shift symbol character before the printing a number of symbol characters.

22. A method of decoding a bar code label formed on a surface, the method comprising:

imaging the bar code label to produce a signal representative of each of a plurality of symbol characters therefrom;

analyzing the signal to identify the symbol characters; and converting each symbol character into a corresponding symbol value, wherein each of the plurality of symbol values are selected from a set of less than 256 symbol values, and wherein a group of symbol values, from the plurality of symbol values, together represent at least one character code when the group of symbol values, when computed together, have a predetermined relationship to a predetermined value, and together represent a string of numeric values otherwise.

23. The method of claim 22, further comprising:

identifying a special symbol character before determining that the set of symbol values together represent at least one character code having at least 8 bits.

24. The method of claim 22 wherein the predetermined relationship is a less than relationship.

25. A printer apparatus for printing machine-readable symbols comprising:

a processor that converts a plurality of character codes to a plurality of symbol values, wherein the plurality of character codes correspond to a plurality of data characters, wherein each of the plurality of symbol values are selected from a set of less than 256 symbol values, and wherein a group of symbol values, when computed together to produce a computed value, represent at least one character code having at least 8 bits when the computed value has a predetermined relationship to a predetermined value, and represent a string of numeric values when the computed value has another predetermined relationship to the predetermined value; and a printer mechanism coupled to the processor that prints a plurality of symbol characters, wherein the plurality of symbol characters correspond to the plurality of symbol values, respectively.

26. The method of claim 25 wherein the processor is configured to generate a flag symbol value when generating a set of symbol values.

27. A reader apparatus for reading machine-readable symbols comprising:

an optical receiver that receives light reflected from a plurality of symbols and produces a signal representing the plurality of symbol characters; and a processor coupled to the optical receiver that receives the signal and converts the plurality of symbol characters to a plurality of symbol values, wherein each of the plurality of symbol values are selected from a set of less than 256 symbol values, wherein at least one group of the plurality of symbol values correspond to at least one character code having at least 8 bits, when the group of symbol values, computed together, has a predetermined relationship to a predetermined value, and correspond to a string of numeric values when the set of computed symbol values has another predetermined relationship to the predetermined value.

28. The reader apparatus of claim 27 wherein the processor is configured to convert at least one flag symbol character before analyzing a set of symbol values.

29. A method of converting data characters to machine-readable symbols, each symbol having a pattern of dark shapes and light spaces between the shapes, the method comprising:

determining a plurality of character codes corresponding to a plurality of data characters, respectively;

converting the plurality of character codes to a plurality of symbol values, wherein each of the plurality of symbol values are selected from a set of less than 256 symbol values, and wherein groups of a selected number of symbol values selected from the set provide at least first and second ranges of numbers under a predetermined formula; and printing a plurality of symbol characters, wherein the plurality of symbol characters correspond to the plurality of symbol values, respectively, and wherein one group of the plurality of symbol values corresponds to at least one character code having at least 8 bits if the one group provides a number, under the predetermined formula, within the first range, and wherein the one group corresponds to a string of numeric digits if the one group provides a number, under the predetermined formula, within the second range.

* * * * *

UNITED STATES PATENT AND TRADEMARK OFFICE
CERTIFICATE OF CORRECTION

PATENT NO. : 6,186,406 B1            Page 1 of 1
DATED : February 13, 2001
INVENTOR(S) : H. Sprague Ackley It is certified that error appears in the above-identified patent and that said Letters Patent is hereby corrected as shown below:

<u>Title page,</u>
Item [56], References Cited, the following UNITED STATES PATENT DOCUMENTS should appear as follows:
-- 5,539,191   7/1996   Ackley --
-- 5,548,110   8/1996   Storch et al. --
-- 5,552,591   9/1996   Bossen et al. --
-- 5,557,092   9/1996   Ackley et al. --
-- 5,612,531   3/1997   Barkan --
-- 5,619,027   4/1997   Ackley --
-- 5,767,498   7/1998   Heske, III et al. --
-- 5,777,310   7/1998   Liu et al. --
-- 5,811,781   9/1998   Ackley --
-- 5,939,700   8/1999   Ackley --

Signed and Sealed this

Eighth Day of January, 2002

*Attest:*

*Attesting Officer*

JAMES E. ROGAN
*Director of the United States Patent and Trademark Office*